Oct. 16, 1934.   B. A. CHRISTIE ET AL   1,977,044
PASTEURIZING OR STERILIZING PLANT
Filed April 25, 1933    5 Sheets-Sheet 1

INVENTORS
Bernard Alexander Christie, Miguel Enrique Guermont,
+ John Manchester Taylor.
Arthur J. Stephens
ATTORNEY

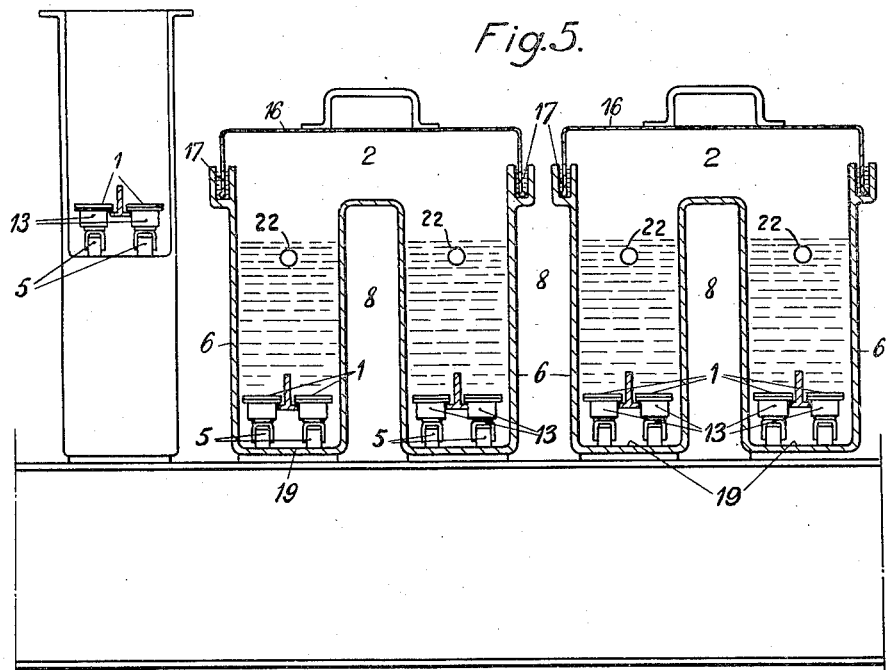
Fig.5.
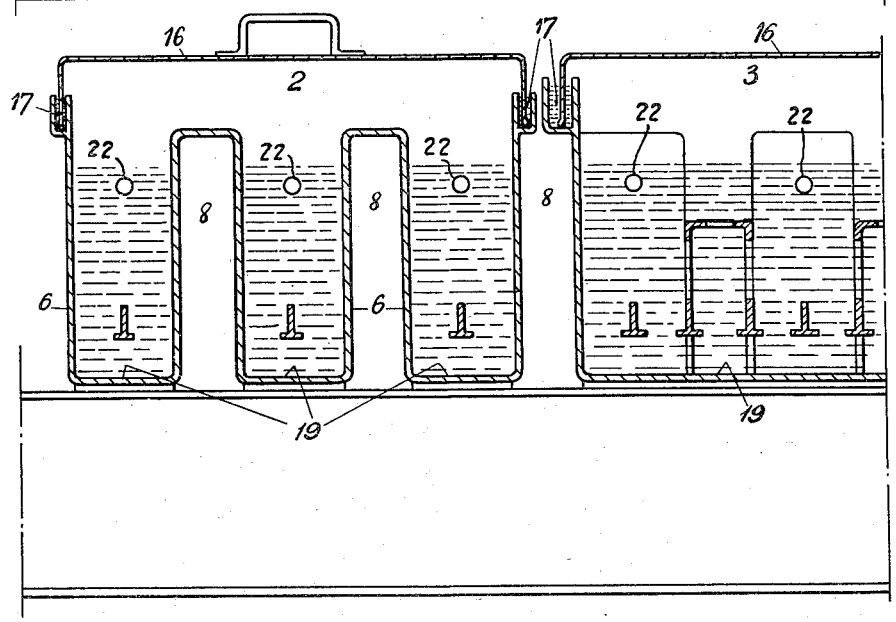
Fig.5.a

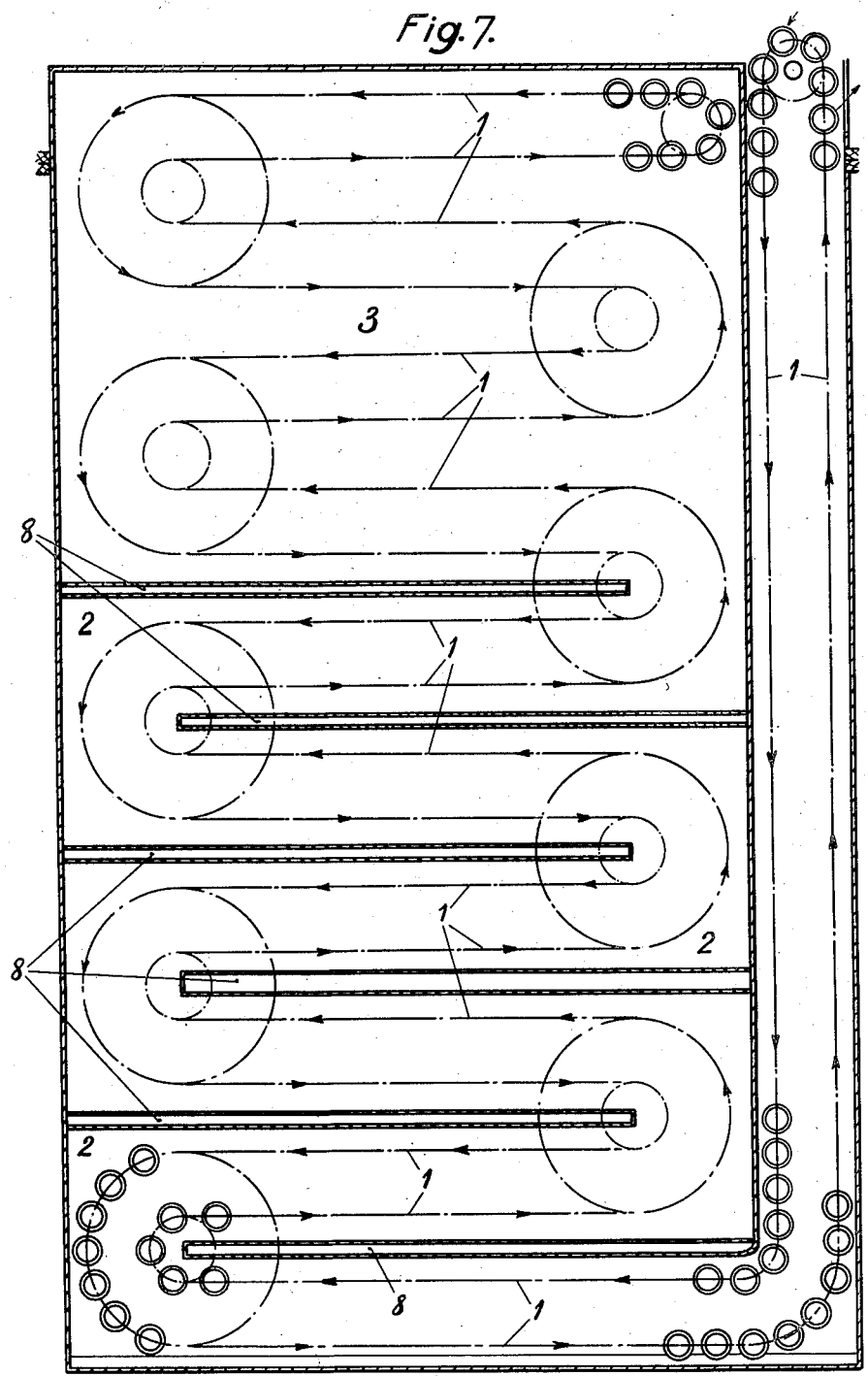

Patented Oct. 16, 1934

1,977,044

UNITED STATES PATENT OFFICE 1,977,044

PASTEURIZING OR STERILIZING PLANT

Bernard Alexander Christie, Birmingham, Miguel Enrique Guermont, Hampstead, London, and John Manchester Taylor, Poultry, London, England Application April 25, 1933, Serial No. 667,850
In Great Britain May 5, 1932

4 Claims. (Cl. 126—272)

We have filed an application in Great Britain on May 5, 1932.

The present invention relates to improvements in pasteurizing or sterilizing plant and particularly to that type of plant in which the vessels containing liquid foods such as milk or beer are placed on a conveyor and conveyed in a procession through a series of chambers which form successively a heating chamber adapted to raise the liquid food to the pasteurizing or sterilizing temperature, a chamber where the food is held at this temperature for an appropriate period of time and a cooling chamber where the food is cooled after the process of pasteurization or sterilization has taken place.

Briefly stated the present invention comprises an arrangement in which the cooling and heating chambers are combined in the form of a continuous channel so as to get a uniform increase in temperature between the point where the vessels are placed on the conveyor and the inlet to the holding chamber and at the same time a uniform decrease of temperature between the outlet of said holding chamber and the vessel discharging point, the arrangement being such that the conveyor travelling from the charging point to the holding chamber and the conveyor leading from the outlet of the holding chamber to the discharging point pass through the same channels thus providing that there is a heat exchange between the hot vessels passing away from the holding chamber and the cold vessels passing into said chamber.

Our invention is shown by way of example in the accompanying drawings in which:—

Figure 1 shows a diagrammatic plan view of the general layout of the plant with the covers removed, Figure 2 shows a section on the line II—II of Figure 1, Figure 3 shows a section on an enlarged scale on the line III—III of Figure 1, Figure 4 shows a plan view of Figure 3 with the cover removed, Figure 5 shows a part section on an enlarged scale on the line V—V of Figure 1, Figure 5a shows a continuation on the line V—V of Figure 1, of the enlarged sectional view shown in Figure 5.

Figure 7 shows a diagrammatic sectional view of a vertical plant with horizontal channel sections.

Figure 1:
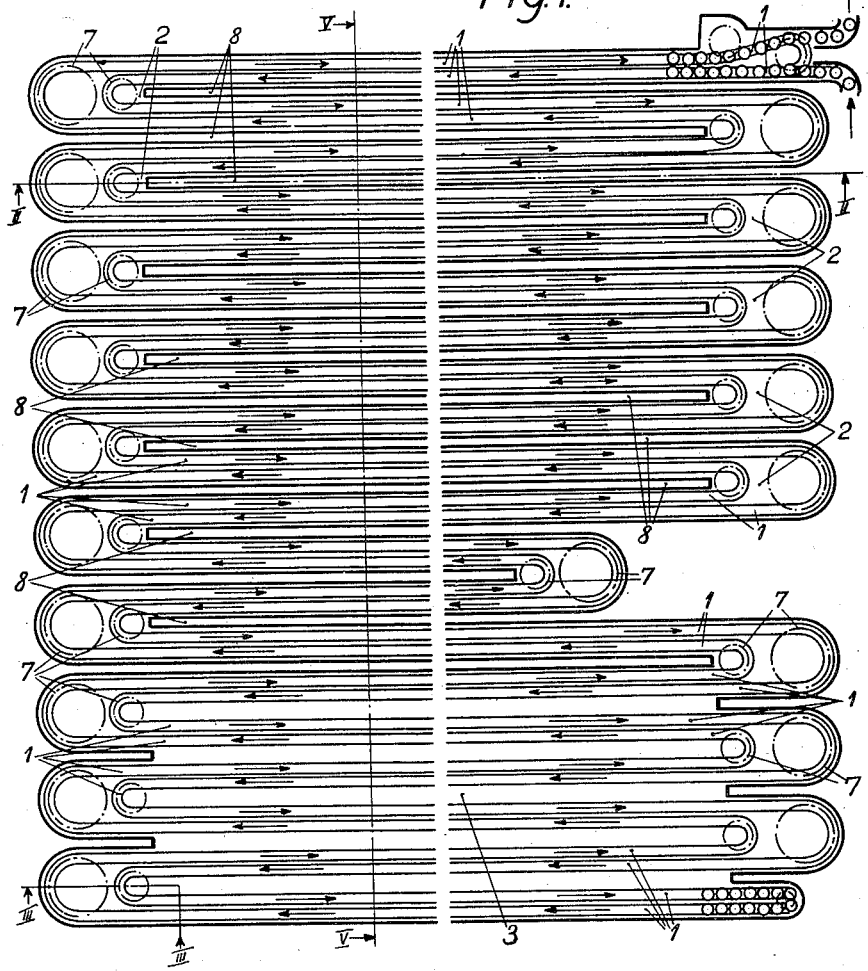
Figure 2:
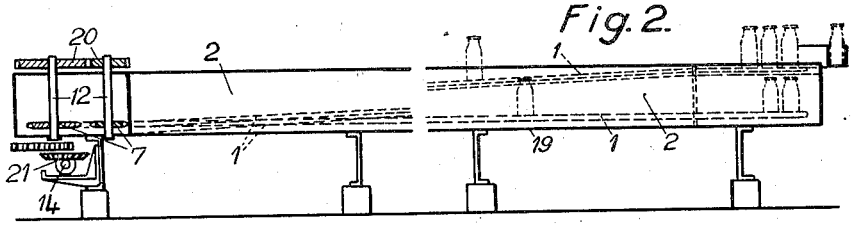

The layout of our invention shown in Figure 1 of the drawings illustrates a vessel conveyor 1 adapted to travel in a horizontal tortuous channel 2 which forms simultaneously the heating and the cooling chamber and from thence through an opening into the adjoining holding chamber 3 containing a fluid held at the pasteurization or sterilization temperature, from which holding chamber 3 the conveyor returns again to said heating and cooling channel 2 and through said channel along the same tortuous path in the opposite direction to the discharging stand.

Both the heating fluid and the heat exchange fluid is more usually water but hot air or steam may be employed for the holding tank by raising the level of the holding chamber above the level of the water in the heat exchange channel.

The conveyor 1 upon which the vessels rest is formed of a series of links 4 which form platforms for the vessels as shown in Figure 5 supported on rollers 5 adapted to ride over the floor 19 of the channel 2 and chamber 3 along the horizontal tortuous path thus carrying the vessels through a fluid which is retained in said holding chamber at the pasteurizing or sterilizing temperature.

In the construction shown the track passes through the straight channel sections 6 connecting the end castings which form the turning points of the tortuous path. These channels are of a width adapted to receive any two portions of the conveyor which may be adjacent while travelling in opposite directions through the chambers. The track channel sections register at their ends with pairs of conveyor pulleys 7 which are conveniently sprocket wheels and which support the conveyor at its turning points in its passage through the channels. The channel sections 6 are separated from each other by insulated partitions. In the construction shown more particularly in Figure 5 the hollow partitions 8 form air chambers between the channel sections. In any position on the tortuous track so formed two portions of the conveyor 1 are travelling in opposite directions and the two series of vessels carried on these adjacent portions of the conveyor towards and away from the holding chamber pass in this narrow channel in close proximity and in opposite directions thus allowing of an exchange of heat between the adjacent vessels so that the series of vessels passing through the heating and cooling chamber 2 to the holding chamber 3 are gradually heated up to the desired temperature while the series of vessels passing from the holding chamber are gradually giving up their heat until they reach the discharging stand at the requisite low temperature.

The holding chamber 3 is provided with a similar tortuous track for the conveyor to that in the heating and cooling chamber but as it is essential that the temperature of the fluid should be the same throughout the said holding chamber 3, the insulated partitions 8 are omitted between the track sections as shown in Figures 1 and 5a.

Figure 3:
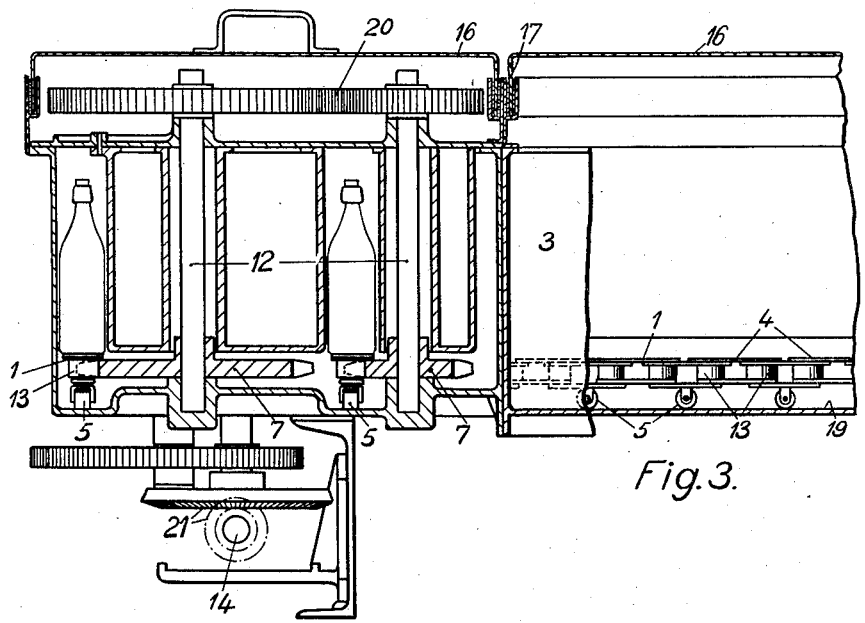
Figure 4:
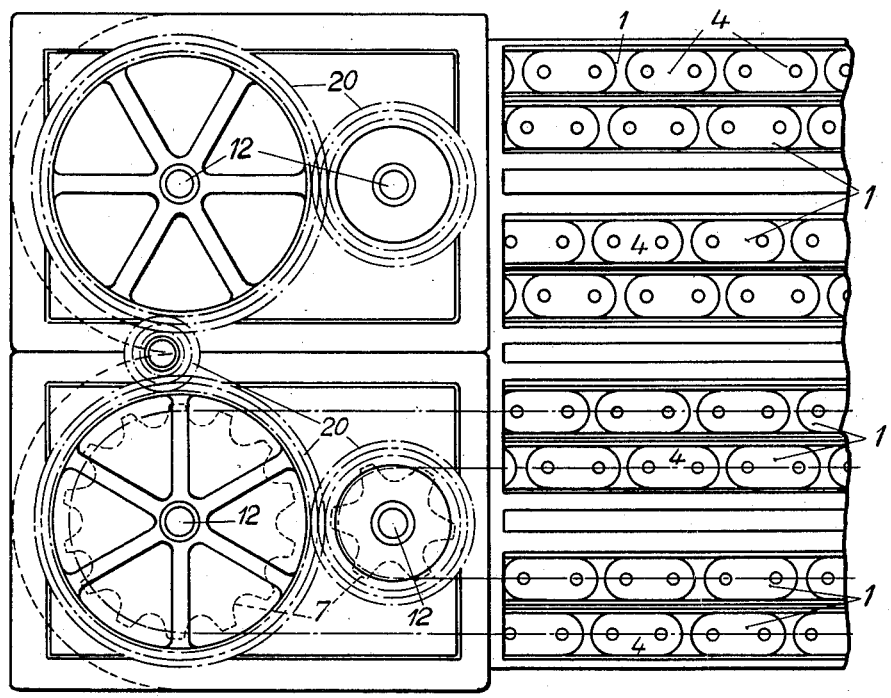
Figure 6:
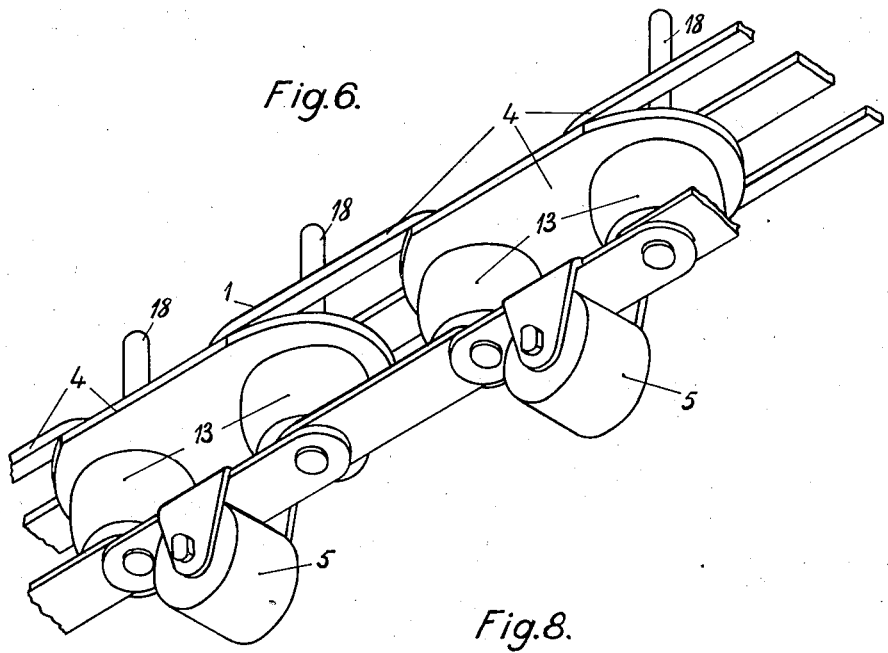
Figure 6 shows a perspective view of a portion of the conveyor.

In the construction shown more particularly in Figures 3 and 4 the turning pulleys 7 at the ends of each channel section are comprised of pairs of sprocket wheels of different diameters respectively mounted on the pairs of parallel countershafts 12 positioned at the ends of said channel sections 6. The adjacent conveyor portions travelling in opposite directions respectively pass over the larger and the smaller pulley at each end of said channel section, the pairs of pulleys being so positioned that a larger pulley at one end of the channel section is opposed to a smaller pulley at the opposite end of the channel section so that the portions of the conveyor travel through the channel sections from a large diameter pulley to a small diameter pulley and from thence back to a large diameter pulley. The sprocket teeth on the peripheries of the pulleys engage pin rollers 13 (Figure 6) extending from the undersides of the link platforms of the conveyor.

As shown in Figures 3 and 4 the drive is transmitted to the conveyor through bevel gearing 21 from the main driving shaft 14 and the countershafts 12 carrying the sprocket wheels 7. Each pair of shafts 12 are connected by gearing 20.

The channel 2 and chamber 3 are closed by the covers 16 (Figure 3) which are sealed at their edges by water seals 17. The fluid in the holding chamber 3 is retained at the desired holding temperature by the steam pipes 22 and is free to pass into the channel sections 6 forming the heating and cooling channel 2.

In the preferred form of our invention a single endless conveyor passes through both the heating and cooling channel and the holding chamber.

Figure 8:
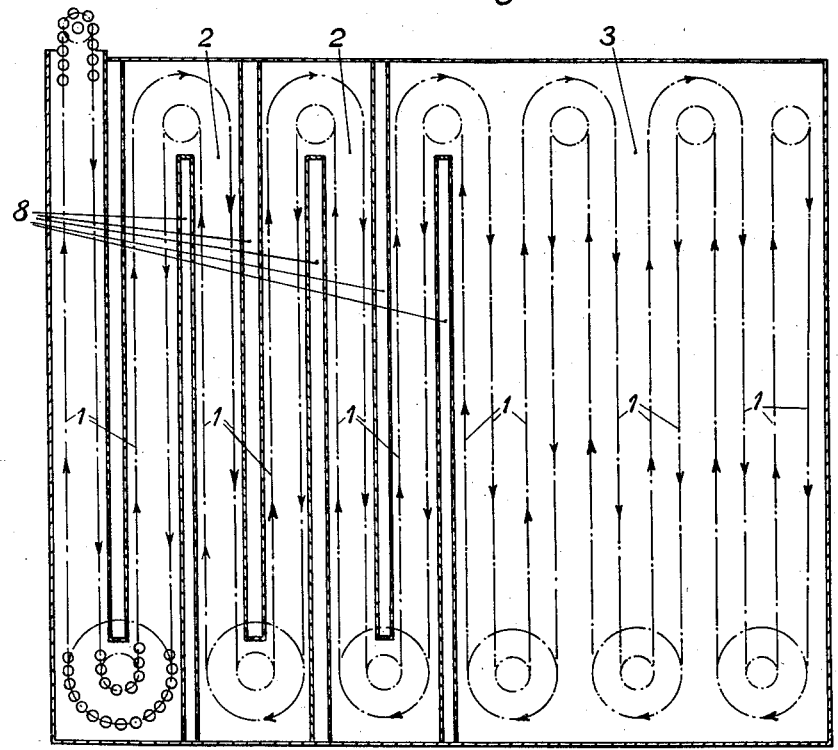
Figure 8 shows a diagrammatic sectional view of a vertical plant with vertical channel sections.

Although we have described more particularly a conveyor passing through a horizontal path, it should be understood that we may arrange a carrier conveyor to pass through a vertical tortuous path as shown in Figures 7 and 8 in which case the vessels will be carried entirely submerged by the liquid in the heating and cooling channel and the liquid in the holding chamber. The channel sections may be horizontal as shown in Figure 7 or vertical as shown in Figure 8.

Although we have described and shown a tortuous path for the conveyor, it should be understood that alternatively a straight path may be employed for the conveyor if sufficient ground space is available through either the heating and cooling channel alone or both the heating and cooling channel and the holding chamber.

Again for automatic loading and unloading of the machine, the floor 19 of the channel may slope gradually above the level of the water as shown in Figure 5. The same arrangement may be employed when it is desired to pass the vessels through brine or other cooling medium contained in a separate chamber at the end of the cooling process.

What we claim is:—

1. Pasteurizing or sterilizing plant comprising a channel containing fluid, a holding chamber communicating with one end of said channel and containing fluid at the pasteurizing or sterilizing temperature, adjacent loading and unloading means at the opposite end of said channel, a two way track in said channel, a track in said holding chamber connected to said two way track and a conveyor adapted to travel over said two way track and to carry a procession of vessels from the loading means through said channel to the holding chamber and from the holding chamber through said channel in the opposite direction to the unloading means, the opposed processions of vessels moving in close proximity and allowing of an exchange of heat between each pair of passing vessels.

2. Pasteurizing or sterilizing plant comprising a channel containing fluid, a floor in said channel sloping gradually above the fluid contained therein, a holding chamber communicating with one end of said channel and containing fluid at the pasteurizing or sterilizing temperature, adjacent loading and unloading means at the opposite end of said channel, a two way track in said channel, a track in said holding chamber connected to said two-way track and a conveyor adapted to travel over said two way track and to carry a procession of vessels from the loading means through said channel to the holding chamber and from the holding chamber through said channel in the opposite direction to the unloading means the opposed processions of vessels moving in opposite directions in close proximity and allowing of an exchange of heat between each pair of passing vessels.

3. Pasteurizing or sterilizing plant comprising an enclosing casing, a horizontal tortuous channel containing fluid formed by straight U-sections extending from side to side of said enclosing casing, insulated partitions between said channel sections, a holding chamber formed by straight U-sections communicating with one end of said channel and containing fluid at the pasteurizing or sterilizing temperature, adjacent loading and unloading means at the opposite end of said channel, water sealed covers closing the U-sections forming said channel and holding chamber, a two way track passing through the sections of said channel, a track in said holding chamber connected to said two-way track and a conveyor adapted to travel over said two way track and to carry a procession of vessels from the loading means through said channel to the holding chamber and from the holding chamber through said channel in the opposite direction to the unloading means, the opposed processions of vessels moving in close proximity and allowing of an exchange of heat between each pair of passing vessels.

4. Pasteurizing or sterilizing plant comprising an enclosing casing, a horizontal tortuous channel containing a fluid and formed by straight channel sections extending from side to side of said enclosing casing, hollow partitions forming air chambers between said channel sections, a holding chamber communicating with one end of said channel and containing fluid at the pasteurizing or sterilizing temperature, adjacent loading and unloading means at the opposite end of said channel, a two way track passing through the sections of said channel and a track in said holding chamber connected to said two-way track and a conveyor adapted to travel over said two way track and to carry a procession of vessels from the loading means through said channel to the holding chamber and from the holding chamber through said channel in the opposite direction to the unloading means, the opposed processions of vessels moving in close proximity and allowing of an exchange of heat between each pair of passing vessels.

BERNARD ALEXANDER CHRISTIE.
MIGUEL ENRIQUE GUERMONT.
JOHN MANCHESTER TAYLOR.